(12) United States Patent
Petell et al.

(10) Patent No.: US 6,302,570 B1
(45) Date of Patent: Oct. 16, 2001

(54) COMPACT ILLUMINATION DEVICE USING OPTICAL FIBERS

(75) Inventors: Michael C. Petell, Long Beach; Anthony Roberts, Rolling Hills Estates, both of CA (US)

(73) Assignee: Fiber Optic Design, Inc., Huntington Beach, CA (US)

( * ) Notice: Subject to any disclaimer, the term of this patent is extended or adjusted under 35 U.S.C. 154(b) by 0 days.

(21) Appl. No.: 09/417,636

(22) Filed: Oct. 14, 1999

(51) Int. Cl.[7] ........................................................ F21V 8/00
(52) U.S. Cl. ............................ 362/554; 40/547; 362/555; 362/570; 362/581
(58) Field of Search .................................... 362/554, 555, 362/556, 570, 571, 581; 40/547

(56) References Cited

U.S. PATENT DOCUMENTS

| | | | |
|---|---|---|---|
| 4,875,144 | 10/1989 | Wainwright | 362/103 |
| 5,086,378 | * 2/1992 | Prince | 362/555 |
| 5,103,581 | * 4/1992 | Novak | 40/547 |
| 5,664,346 | * 9/1997 | Barker | 362/570 |

\* cited by examiner

Primary Examiner—Stephen Husar
(74) Attorney, Agent, or Firm—Michael A. Painter

(57) ABSTRACT

An illuminating device includes an electronic assembly, a light source, a switch, a housing and a bundle of optical fibers. The electronic assembly is coupled to a power source. The light source is coupled to the electronic assembly to emit light. The switch is coupled to the electronic assembly to activate the power source for controlling an illumination from the light source. The housing has a base and a cover. The base provides a rib guide to secure the light source and an area for holding the electronic assembly. The cover and the base, when coupled together via a coupling post, provide an aperture at one end of the housing. The bundle of optical fibers has a proximal end, a distal end and a longitudinal length. The proximal end is formed by the first ends of the optical fibers. The distal end is formed by the second ends of the optical fibers. The proximal end is securely mounted in a bundle holder disposed through the aperture and positioned at a predetermined focal distance from the light source to allow light from the light source to be transmitted to the distal end along the longitudinal length.

26 Claims, 8 Drawing Sheets

COMPACT ILLUMINATION DEVICE USING OPTICAL FIBERS

BACKGROUND OF THE INVENTION

1. Field of the Invention

The present invention relates to fiber optic. More particularly, the present invention relates to a method and apparatus for an illumination device using optical fibers.

2. Description of Related Art

Illumination using optical fibers can be used in a number of applications such as medical instruments, toys, safety devices, and novelty items.

Traditional techniques for illumination using optical fibers have a number of problems. First, these techniques are designed for specific applications and therefore cannot be used in a wide variety of applications. Second, the construction does not allow flexible adjustment for the focal length between the light source and the optical fibers. Third, the resulting device is not compact and energy efficient and cannot be used in applications such as apparel and clothing illumination.

Therefore, there is a need to have a versatile, compact, and flexible illumination device that can be adapted in a number of applications.

SUMMARY OF THE INVENTION

The present invention is an illuminating device including an electronic assembly, a light source, a switch, a housing and a bundle of optical fibers. The electronic assembly receives power from a power source. The light source is coupled to the electronic assembly to emit light. The switch is coupled to the electronic assembly to activate the power source for controlling an illumination from the light source. The housing has a base and a cover. The base provides a rib guide to secure the light source and an area for holding the electronic assembly. The cover and the base, when coupled together via a coupling post, provide an aperture at one end of the housing. The bundle of optical fibers has a proximal end, a distal end and a longitudinal length. The proximal end is formed by the first ends of the optical fibers. The distal end is formed by the second ends of the optical fibers. The proximal end is securely mounted in a bundle holder disposed through the aperture and positioned at a predetermined focal distance from the light source to allow light from the light source to be transmitted to the distal end along the longitudinal length.

In one embodiment, the cover of the illuminating device has an opening to allow the power source to be secured onto the electronic assembly. The opening is closed by a closure attachable to the housing via a screw assembly that tightens the closure to the coupling post.

BRIEF DESCRIPTION OF THE DRAWINGS

The features of the present invention will become more apparent and the invention will be best understood by reference to the following description and the accompanying drawings, wherein.

DETAILED DESCRIPTION OF THE INVENTION

The present invention discloses a method and apparatus of an illumination device. The device provides a light source to emit light through a bundle of optical fibers. The light source is powered by a power source and is controlled by a switch. In one embodiment, the light source, the power source, and the switch are housed in a housing having a base and a cover. The base provides guides to secure the light source and the optical fiber bundle. By positioning the bundle of optical fibers at an optimum focal distance from the light source, the illumination of the optical fibers is maximized. Various illuminating modes can be performed including flashing. The illumination device is compact, energy efficient, and can be used in different illuminating applications.

Figure 1A:
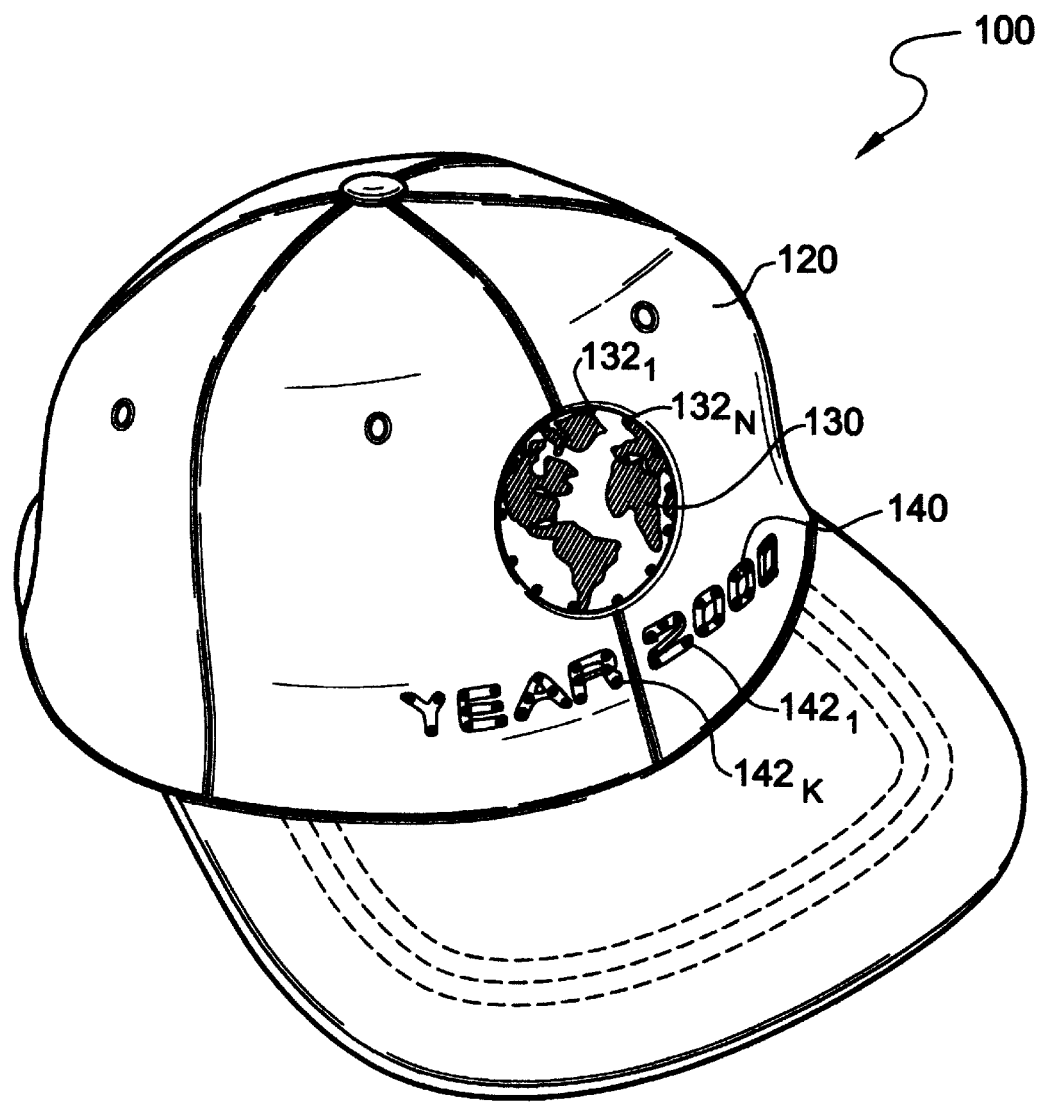
FIG. 1A is a diagram illustrating an outside view of a display item in which one embodiment of the present invention can be practiced.

FIG. 1A is a diagram illustrating an outside view of a display item 100 in which one embodiment of the present invention can be practiced. The display item 100 is a baseball hat. It is contemplated that the invention can be practiced with any display item that has a plurality of symbols on a surface. Examples of these display items include helmets, display signs, signaling devices, etc. The surface of the display item may be hard or soft.

The display item 100 has a surface 120 on which a plurality of symbols 130 and 140 are located. In this exemplary display system, the symbol 130 is a picture of the globe having a circle. The symbol 130 has N illuminating points $132_1$ to $132_N$ spaced in such a way that when these points are illuminated, the symbol 130 becomes highlighted. The symbol 140 is a lettering of the words YEAR 2000. The symbol 140 has K illuminating points $142_1$ to $142_K$ spaced in such a way that when these points are illuminated, the letters YEAR 2000 become highlighted.

Figure 1B:
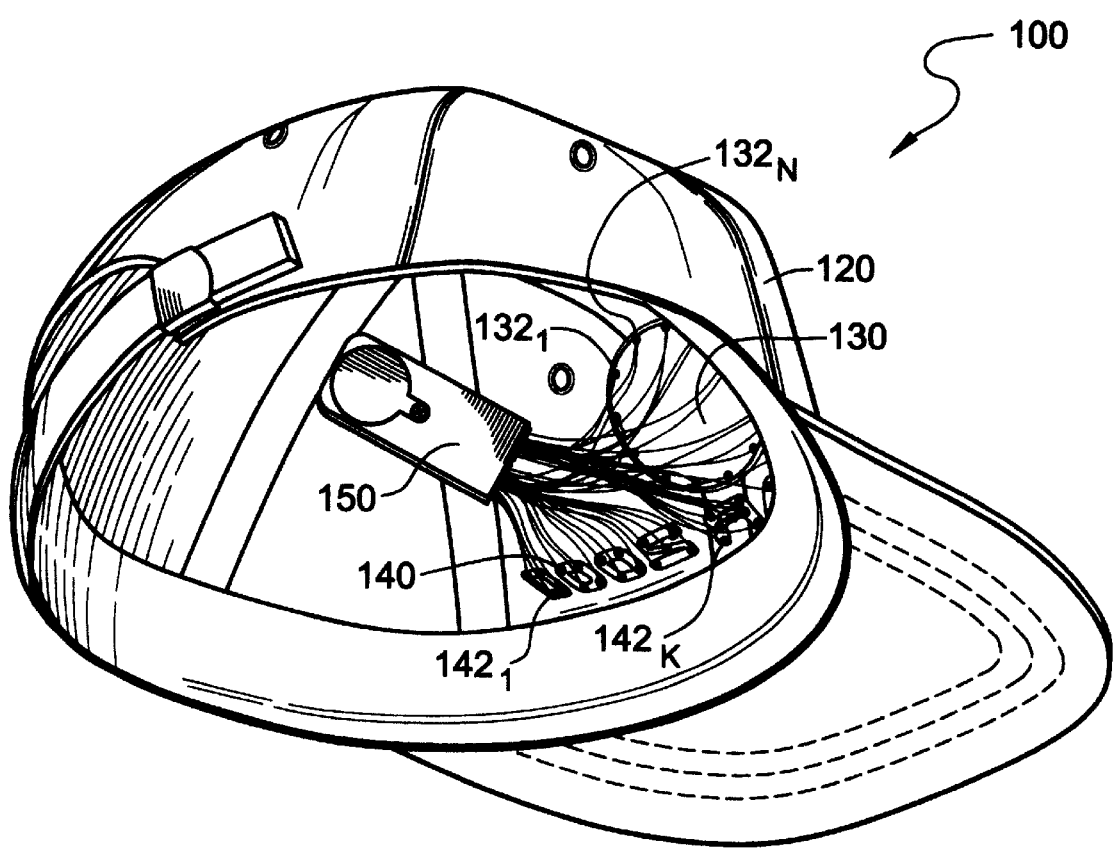
FIG. 1B is a diagram illustrating an inside view of the display item shown in FIG. 1A.

FIG. 1B is a diagram illustrating an inside view of the display item 100 shown in FIG. 1A. The inside view shows the surface 120, the symbols 130 and 140 and the corresponding illuminating points $132_1$ to $132_N$ and $142_1$ to $142_N$, and an illuminating device 150.

The illuminating device 150 is mounted onto the inside surface of the display item 100 in such a way that it is not visible when the display item 100 is worn. Since the illuminating device 150 is compact and of small size, it is easily concealed. Furthermore, the illumination device 150 is light and therefore suitable for apparel items such as hats, helmets, clothes, jackets, etc.

As will be explained later, the illumination device 150 has a bundle of optical fibers formed by many strands. A typical bundle has between 25 to 100 strands of optical fibers. These strands are attached to the illuminating points $132_1$ to $132_N$ and $142_1$ to $142_N$ so that when light is transmitted through the fibers, the ends of these strands are lighted and illuminate the illuminating points. For apparel items, the strands can be easily sewn directly to the illuminating points which may further reinforce the attachment of the illumination device 150 to the surface 120.

The illumination device 150 can be implemented by a number of embodiments. In one embodiment, the illumination device 150 uses a single light source and single bundle of optical fibers. In another embodiment, the illumination device 150 uses dual light sources and dual bundles of optical fibers. In yet another embodiment, the illumination device 150 uses external power source and external light source.

Figure 2A:
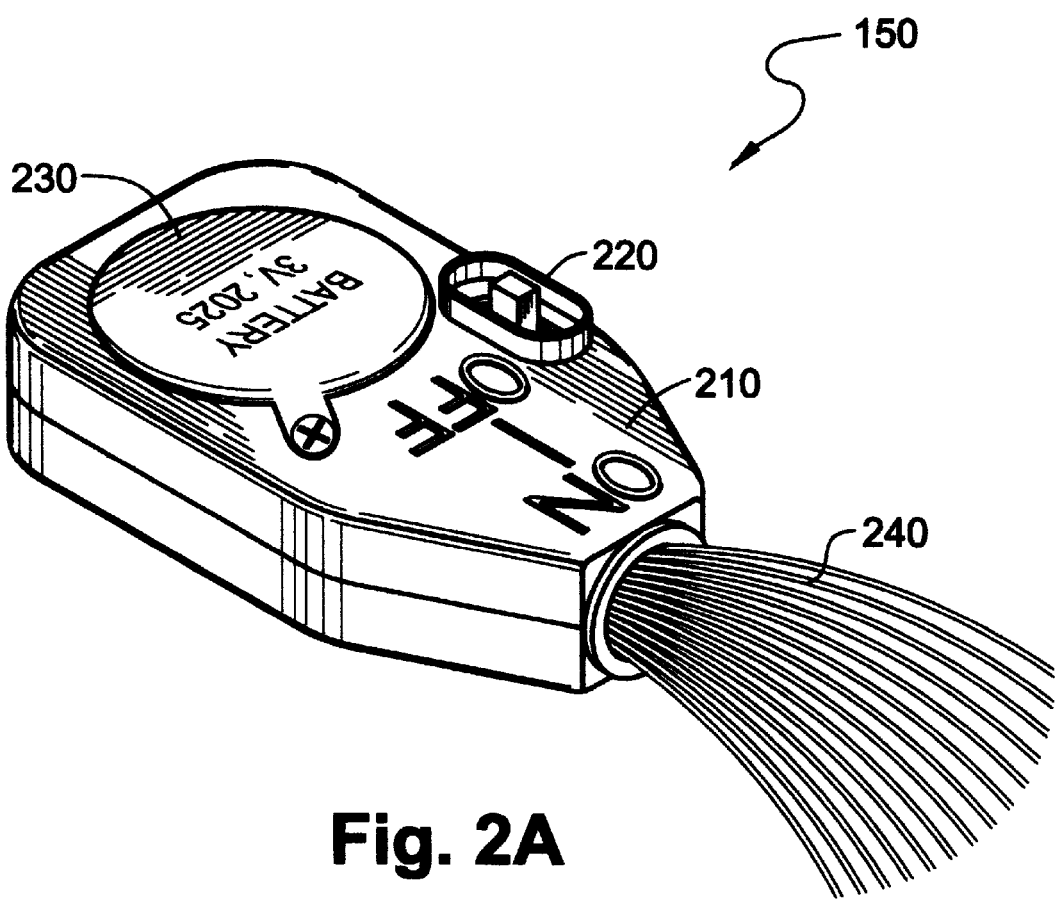
FIG. 2A is a diagram illustrating a single source illumination device according to one embodiment of the present invention.

FIG. 2A is a diagram illustrating a single source illumination device 150 according to one embodiment of the present invention. The single source illumination device 150 includes a housing 210, a switch opening 220, a power source closure 230, and a bundle of optical fibers 240.

The housing 210 provides a placement of the electronic, optic, and mechanical components. The housing 210 can be manufactured using micro-casing technology with water-resistant materials so that it can be used in wet or humid conditions and small items such as children's hats, apparel items. The housing 210 is sealed to prevent battery leakage.

The switch opening 220 allows positioning a mechanical switch coming out from the inside of the housing 210. As will be shown later, the mechanical switch is used to activate a power source to control an illumination of the bundle of optical fibers 240. The switch opening 220 is designed to have protective guide surrounding the mechanical switch so that accidental switch activation can be avoided.

The power source closure 230 is a removable closure having a circular shape matching the shape of a battery. The power source closure 230 can be opened so that the battery can be inserted inside to provide the power for illuminating the light source.

The bundle of optical fibers 240 includes a number of optical fiber strands. In one embodiment, the number of optical fiber strands ranges from 25 to 100. The lengths of the optical fiber strands may be equal or unequal. Unequal lengths provide simplicity and flexibility for mounting on a display item. In addition, unequal lengths also produce more interesting optical effects.

Figure 2B:
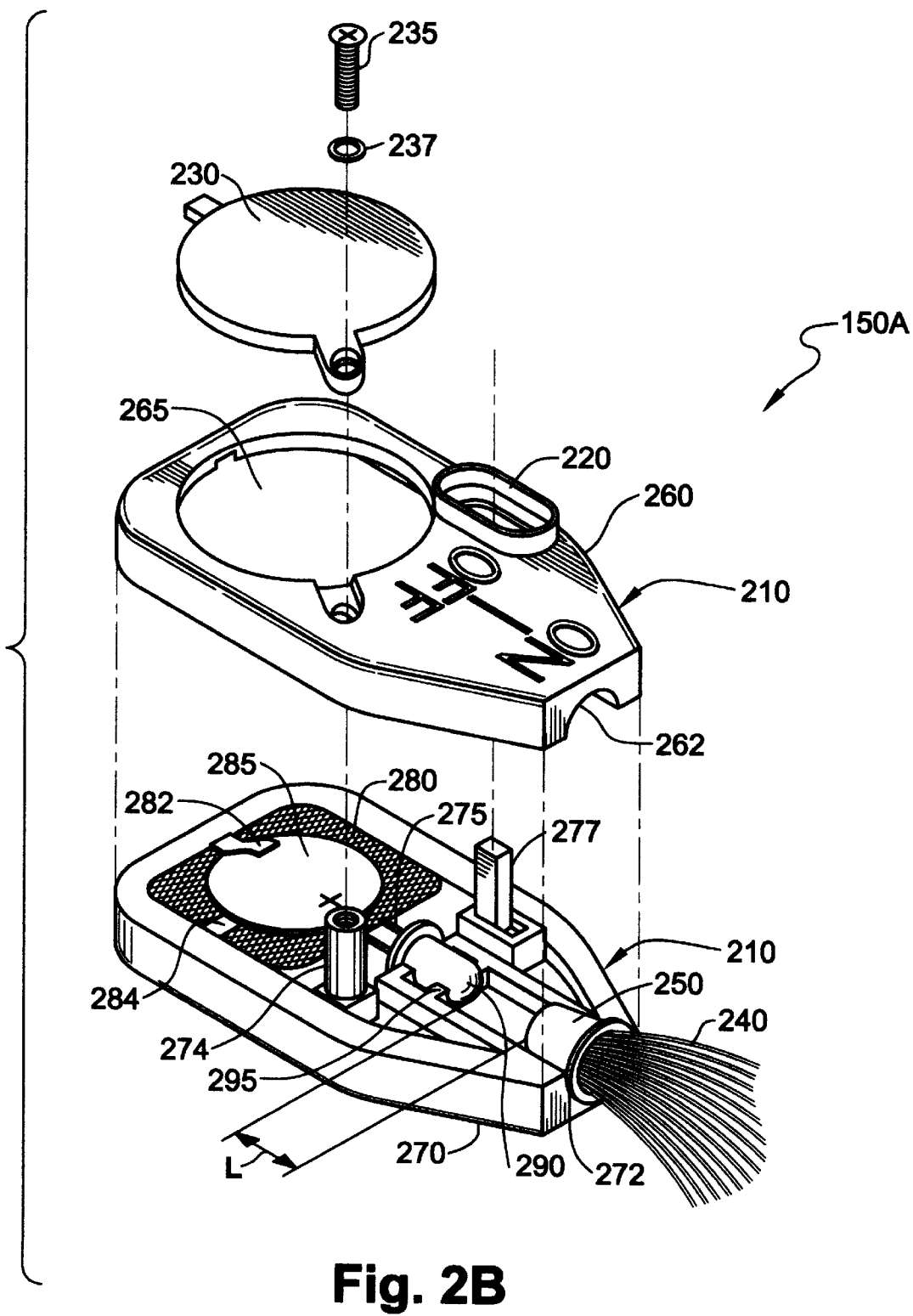
FIG. 2B is a diagram illustrating an exploded view of the single source illumination device shown in FIG. 2A.

FIG. 2B is a diagram illustrating an exploded view of the single source illumination device 150A shown in FIG. 2A. The single source illumination device 150A includes a cover 260, a base 270, a switch 277, a coupling post 274, an electronic assembly 280, a power source 285, and a light source 290.

The cover 260 and the base 270 form the housing 210. The cover 260 and the base 270 are sealed or glued together during the manufacturing process. The cover 260 has the switch opening 220, a power source opening 265, and a cover bundle opening 262. The power source opening 265 allows a power source element such as a battery to be placed inside the housing 210. The power source opening 265 is closed by the power source closure 230. The power source closure 230 is secured to the housing through a small notch via a screw assembly including a screw 235 and a retainer washer 237. The screw assembly tightens the power source closure 230 onto the coupling post 274. The retainer washer 237 is used to keep the screw 235 attached to the power source closure 230 when the power source closure 230 is removed from the housing 210 during a change of power source element.

The base 270 has a base bundle opening 272, a rib guide 295, and an area that holds the electronic assembly 280. The base bundle opening 272 and the cover bundle opening 262 form an aperture at one end of the housing 210 when the cover 260 and the base 270 are coupled together by sealing or gluing.

The coupling post 274 provides a coupling mechanism between the cover 260 and the base 270. The coupling post 274 also allows the screw assembly 235 and 237 to tighten the power source closure 230 onto the housing 210.

The electronic assembly 280 includes an small board having signal traces to connect the light source 290, the switch 277, the positive and negative contact terminals 282 and 284 to the power source 285. The electronic assembly 280 is located at an end opposite to the aperture. The electronic assembly 280 and the positive and negative contact terminals 282 and 284 provide a secure and firm placement for the power source 285.

The power source 285 is any convenient power source. In one embodiment, the power source 285 is a battery having a circular shape that fit on the electronic assembly 280. The battery can provide power to the light source 290 for up to 80 hours of continuous illumination.

The light source 290 is connected to the electronic assembly 280 via conductors 275. The light source 290 receives power from the power source 285 upon a switch activation of the switch 277 to emit light. The light source 290 may be a light bulb, a lamp, or a light emitting diode (LED). As is known by one skilled in the art, any device that can emit light can be used as the light source 290. The light source 290 is positioned on the rib guide 295. The rib guide 295 includes a number of ribs that are constructed to hold the light source 290 securely in place. The locations of the ribs are determined in advance to provide an optimal focal distance to the bundle 240. The focal distance between the light source 290 and the bundle 240 therefore can be adjusted by placing the light source 290 at the appropriate rib.

The bundle of optical fibers 240 has a proximal end, a distal end and a longitudinal length. The proximal end is formed by the first ends of the optical fibers. The distal end is formed by the second ends of the optical fibers. The proximal end is securely mounted in a bundle holder 250 through the aperture formed by the base bundle opening 272 and the cover bundle opening 262. The proximal end is positioned at a focal distance L from the light source 290 to allow light from the light source to be transmitted to the distal end, i.e., the second ends of the optical fibers, along the longitudinal length. As discussed earlier, the focal distance L is selected such that the light emitted from the light source 290 is optimally collected through the optical fibers.

The dimensions of the illumination device 150A are such that the device is compact. In one embodiment, the housing 210 has dimensions of approximately 2 to 3 centimeters wide and 5 to 7 centimeters long. The focal length L ranges from 3 millimeters to 10 millimeters.

Figure 2C:
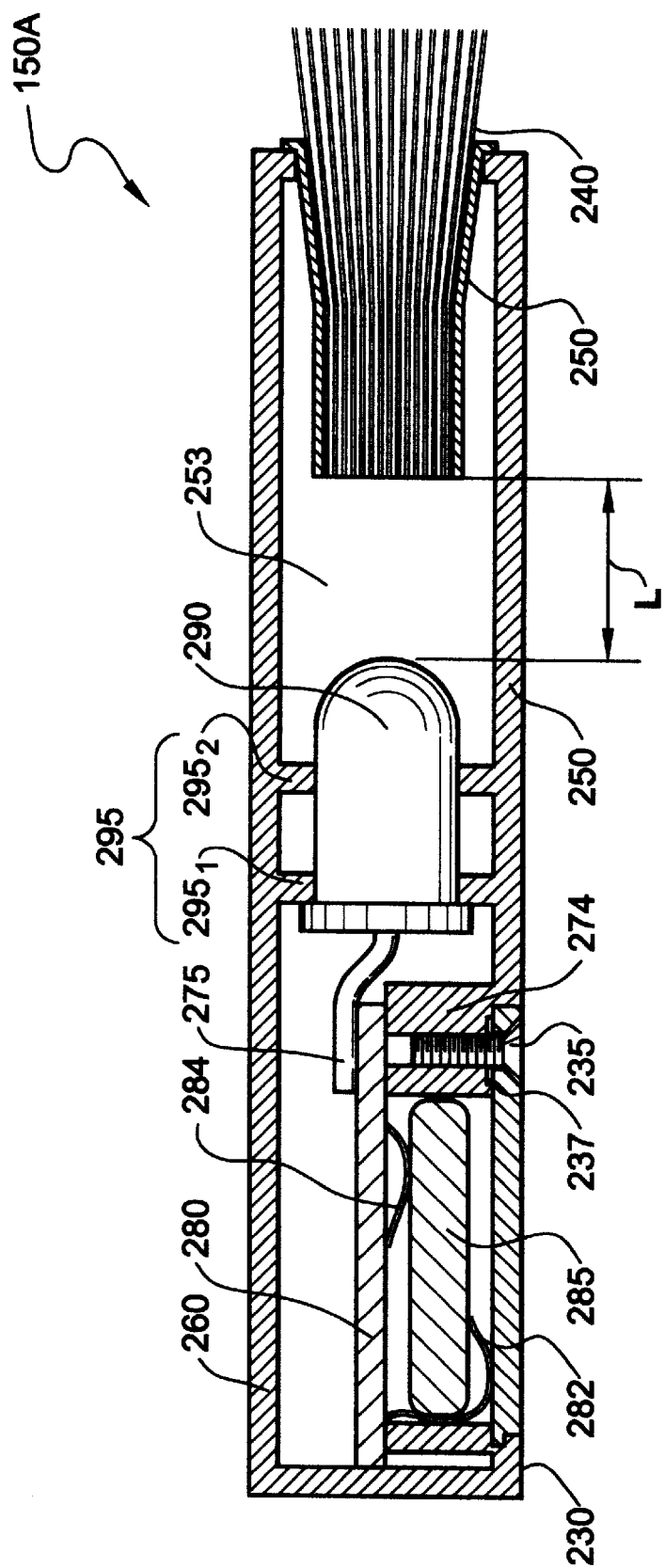
FIG. 2C is a diagram illustrating a sectional view of the single source illumination device shown in FIG. 2A.

FIG. 2C is a diagram illustrating a sectional view of the single source illumination device shown in FIG. 2A.

In one embodiment of the present invention, the bundle of optical fibers has substantial longitudinal length and includes only a few optical fibers. Each of these optical fibers is sanded such that about one inch of each of the optical fibers measured from the respective second end is stripped of the cladding. This removal of cladding allows the light emitted from the light source 290 to be visible along the distance of about one inch from the second ends of the optical fibers. This embodiment of the present invention can be used in toys, such as an exerciser for a cat.

Figure 3A:
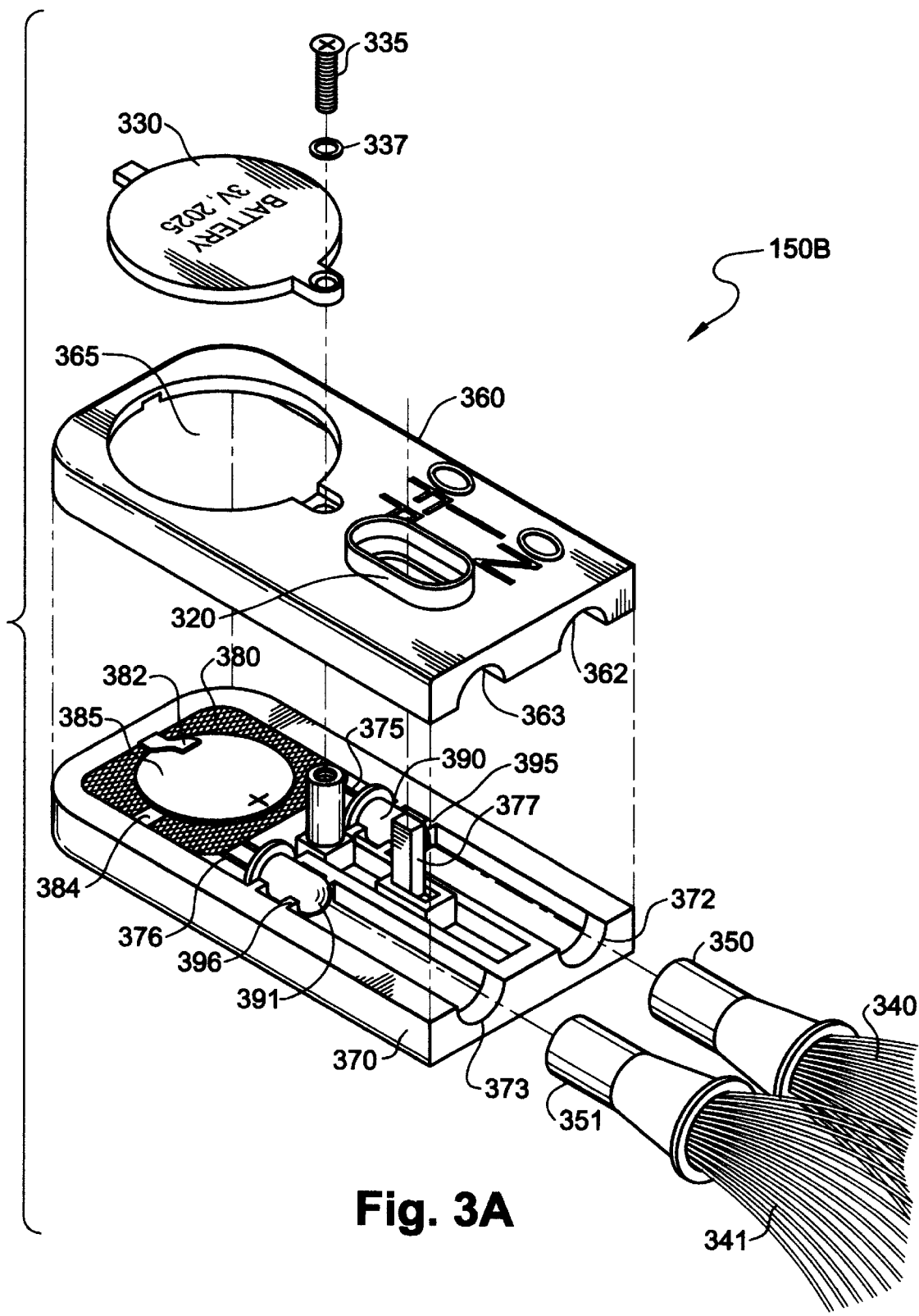
FIG. 3A is a diagram illustrating an exploded view of the dual source illumination device according to one embodiment of the present invention.

FIG. 3A is a diagram illustrating an exploded view of the dual source illumination device 150B according to one embodiment of the present invention. The construction of the dual source illumination device 150B is similar to that of the single source illumination device 150A except that there are two light sources and two bundle of optical fibers. The dual source illumination device 150B includes a cover 360, a base 370, a switch 377, a coupling post 374, an electronic assembly 380, a power source 385, two light sources 390 and 391, and two bundle of optical fibers 340 and 341. As is known by one skilled in the art, more than two light sources or two bundles of optical fibers can be used.

The cover 360 and the base 370 form the housing 310. The cover 360 and the base 370 are sealed or glued together during the manufacturing process. The cover 360 has the switch opening 320, a power source opening 365, and two cover bundle openings 362 and 363. The power source opening 365 allows a power source element such as a battery to be placed inside the housing 310. The power source opening 365 is closed by the power source closure 330. The power source closure 330 is secured to the housing through a small notch via a screw assembly including a screw 335 and a retainer washer 337. The screw assembly tightens the power source closure 330 onto the coupling post 374. The retainer washer 237 is used to keep the screw 235 attached to the power source closure 230 when the power source closure 230 is removed from the housing 210 during a change of power source element.

The base 370 has two base bundle openings 372 and 373, two rib guides 395 and 396, and an area that holds the electronic assembly 380. The base bundle openings 372 and 373 and the cover bundle openings 362 and 363 form two apertures at one end of the housing 310 when the cover 360 and the base 370 are coupled together by sealing or gluing.

The coupling post 374 provides a coupling mechanism between the cover 360 and the base 370. The coupling post 374 also allows the screw assembly 335 and 337 to tighten the power source closure 330 onto the housing 310.

The electronic assembly 380 includes an small board having signal traces to connect the light source 390, the switch 377, the positive and negative contact terminals 382 and 384 for the power source 385. The electronic assembly 380 is located at an end opposite to the apertures. The electronic assembly 380 and the positive and negative contact terminals 382 and 384 provide a secure and firm placement for the power source 285. The electronic assembly 380 also contains a circuit to generate a flashing sequence when the power is activated by the switch 377. The flashing sequence generates alternating light emission from the two light sources 390 and 391 to provide special illumination patterns (including chasing light pattern). The flashing circuit may be constructed using simple timer devices with discrete components such as resistors and capacitors as is known by one skilled in the art.

The power source 385 is any convenient power source. In one embodiment, the power source 385 is a battery having a circular shape that fit on the electronic assembly 380. The battery can provide power to the light sources 390 and 391 for up to 80 hours of continuous illumination.

The light sources 390 and 391 are connected to the electronic assembly 380 via conductors 375 and 376, respectively. The light sources 390 and 391 receive power from the power source 385 upon a switch activation of the switch 377 to emit light. The light sources 390 and 391 may be a light bulb, a lamp, or a light emitting diode (LED). As is known by one skilled in the art, any device that can emit light can be used as the light sources 390 and 391. The light sources 390 and 391 are positioned on the rib guides 395 and 396, respectively. The rib guides 395 and 396 include a number of ribs that are constructed to hold the light sources 390 and 391, respectively, securely in place. The locations of the ribs are determined in advance to provide an optimal focal distance to the bundles 340 and 341. The focal distance between the light sources 390 and 391 and the bundles 340 and 341 therefore can be adjusted by placing the light source 390 and 391 at the appropriate ribs.

Each of the bundles of optical fibers 340 and 341 has a proximal end formed by the first ends of the optical fibers, a distal end formed by the second ends of the optical fibers, and a longitudinal length. The proximal ends of the bundles 340 and 341 are securely mounted in bundle holders 350 and 351, respectively, through the two apertures formed by the base bundle openings 372, 373 and the cover bundle openings 362, 363. The proximal ends of the bundles 340 and 341 are positioned at a focal distance L from the light sources 390 and 391 to allow light from the light source to be transmitted to the second ends of the optical fibers along the longitudinal length. As discussed earlier, the focal distance L is selected such that the light emitted from the corresponding light source is optimally collected through the optical fibers.

The dimensions of the illumination device 150B are such that the device is compact. In one embodiment, the housing 310 has dimensions of approximately 2 to 3 centimeters wide and 5 to 7 centimeters long. The focal length L ranges from 3 millimeters to 10 millimeters.

Figure 3B:
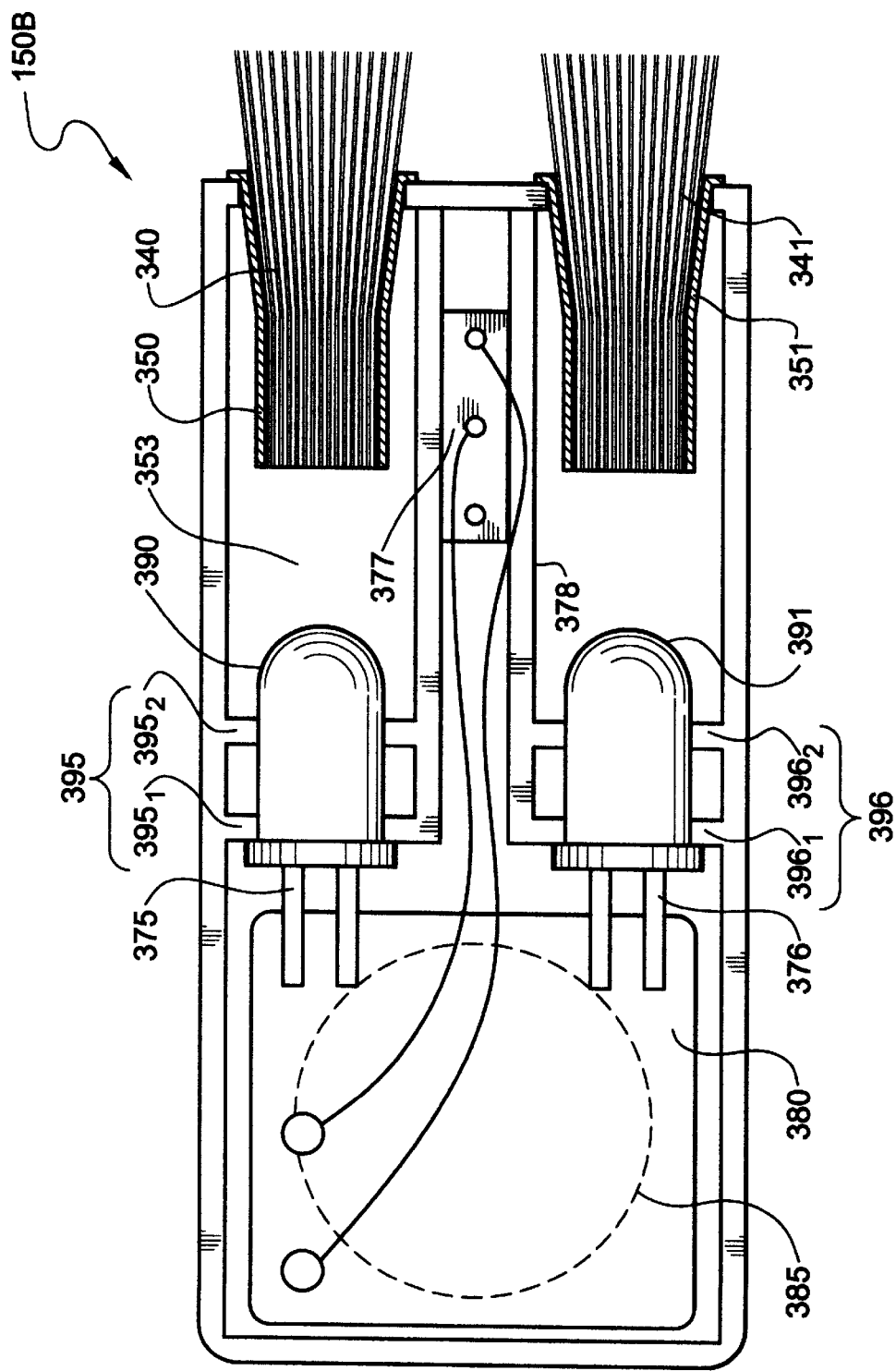
FIG. 3B is a diagram illustrating a sectional view of the dual source illumination device shown in FIG. 3A.

FIG. 3B is a diagram illustrating a sectional view of the dual source illumination device shown in FIG. 3A.

Figure 4:
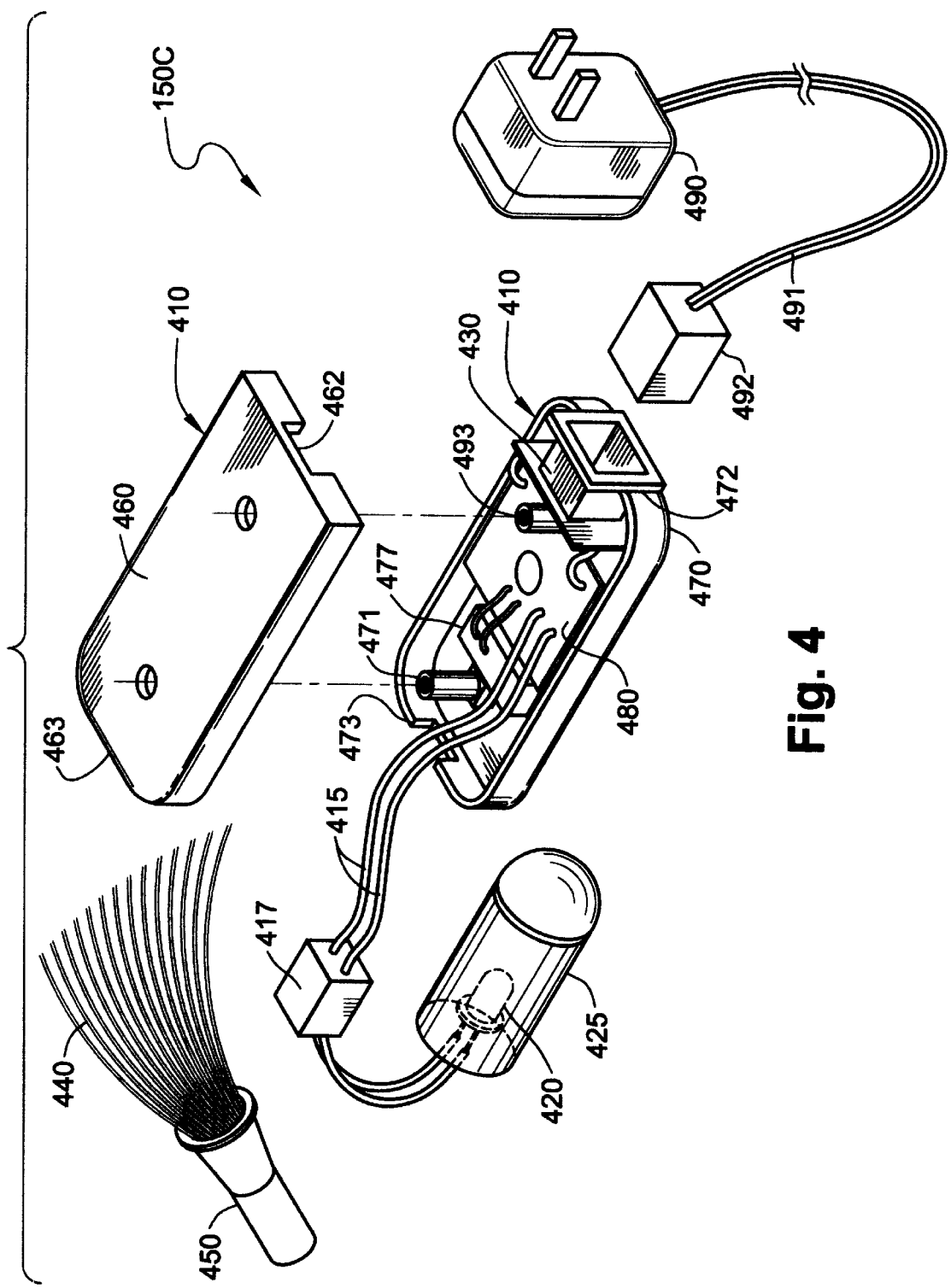
FIG. 4 is a diagram illustrating an exploded view of an illumination device with external power source according to one embodiment of the present invention.

FIG. 4 is a diagram illustrating an exploded view of an illumination device 150C with external power source constructed according to one embodiment of the present invention. The illumination device 150C includes a light source 420, a holder 425, a receptacle 430, an electronic assembly 480, a cover 460, a base 470, a bundle of optical fibers 440, a switch 477, and an external plug 492 and external power adapter 490.

The illumination device 150C is essentially similar to the illumination device 150A except that the power source (not shown), the light source 420 and the bundle of optical fibers 440 are located external to the housing 410 formed by the cover 460 and the base 470.

The housing 410, formed by the cover 460 and the base 470, encloses the switch 477, the electronic assembly 480, and the receptacle 430. The cover 460 has a cover receptacle opening 462 on one end and a cover bundle opening 463 on the opposite end. The base 470 has a base receptacle opening 472 on one end and a base bundle opening 473 on the opposite end. When the cover 460 and the base 470 are sealed or glued together during the manufacturing process, a receptacle aperture is formed by the cover receptacle opening 462 and the base receptacle opening 472, and a bundle opening aperture is formed by the cover bundle opening 463 and the base bundle opening 473.

The base 470 has two coupling posts 471 and 493 to allow coupling to the cover 460 by screws or any convenient fastening mechanism. The switch 477 is a mechanical switch coupled to the electronic assembly 480 to activate the power for controlling an illumination of the light source 420.

The receptacle 430 is connected to the electronic assembly 480 and is disposed proximal to the receptacle aperture to provide contact for the external power source. The external power adapter 490 is coupled to the receptacle 430 via a cable 491 and a plug 492. When the external power adapter 490 is connected to an external power source, the external power source provides power to the electronic assembly 480 which in turn provides power to the light source 420.

The light source 420 is disposed inside the holder 425, and is connected to the electronic assembly 480 via the electrical conductors 415 and the connector 417. In addition to providing housing for the light source 420, the holder 425 is used to hold the bundle holder 450 which holds one end of the bundle of optical fibers 440. The electrical conductors have sufficient length to allow the connector 417 and the holder 425 to be located conveniently near the illuminating symbols. The electrical conductors 415 pass through the bundle opening aperture formed by the cover bundle opening 463 and the base bundle opening 473.

The illumination device 150C uses external power source and external light source. The illumination device 150C is therefore useful for applications where long-life power source is desired such as signage, large display lighting, safety lights, etc.

With respect to the above description, it is understood that the optimum dimensional relationships for the parts of the invention, and variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

While certain exemplary embodiments have been described in detail and shown in the accompanying drawings, it is to be understood that such embodiments are merely illustrative of and not restrictive on the broad invention. It will thus be recognized that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. An illuminating device comprising:
   an electronic assembly for receiving a power source;
   a light source coupled to the electronic assembly to emit light;
   a switch coupled to the electronic assembly to activate the power source for controlling an illumination from the light source;
   a housing having a base and a cover, the base providing a rib guide to secure the light source and an area for holding the electronic assembly, the cover and the base, when coupled together via a coupling post, providing an aperture at one end of the housing; and
   a bundle of optical fibers having a proximal end, a distal end and a longitudinal length, the proximal end and the distal end being formed respectively by first ends and second ends of the optical fibers, the proximal end securely mounted in a bundle holder through the aperture and positioned at a predetermined focal distance from the light source to allow light from the light source to be transmitted to the second ends of the optical fibers along the longitudinal length.

2. The illumination device of claim 1 wherein the cover has an opening to allow the power source to be secured onto the electronic assembly, the opening being closed by a closure attachable to the housing via a screw assembly that tightens the closure to the coupling post.

3. The illumination device of claim 1 wherein the power source is a battery.

4. The illumination device of claim 1 wherein the light source comprises at least a light emitting diode (LED).

5. The illumination device of claim 1 wherein the optical fibers are of unequal lengths.

6. The illumination device of claim 1 wherein the electronic assembly comprises a circuit to generate a flashing sequence to the light source when the switch activates the power source.

7. The illumination device of claim 1 wherein the rib guide provides a plurality of ribs to secure the light source at corresponding focal distances from the bundle of the optical fibers.

8. The illumination device of claim 7 wherein the housing is approximately five centimeters long and approximately two centimeters wide.

9. The illumination device of claim 8 wherein the focal distance ranges from 3 millimeters to 10 millimeters.

10. The illumination device of claim 1 wherein the longitudinal length is substantial and wherein the optical fibers are sanded such that about one inch of each of the optical fibers measured from respective second end is stripped of cladding.

11. An illuminating device comprising:
    an electronic assembly for receiving a power source;
    a housing having a base and a cover, the base providing an area for holding the electronic assembly, the cover and the base, when coupled together via at least a coupling post, providing a first aperture at a first end of the housing and a second aperture at a second end of the housing;
    a receptacle coupled to the electronic assembly to provide contact for the power source, the receptacle being disposed proximal to the first aperture;
    a light source coupled to the electronic assembly via electrical conductors of predetermined lengths, the electrical conductors extending through the second aperture, the light source being disposed within a light source holder;
    a switch coupled to the electronic assembly to activate the power source for controlling an illumination from the light source; and
    a bundle of optical fibers having a proximal end, a distal end and a longitudinal length, the proximal end and the distal end being formed respectively by first ends and second ends of the optical fibers, the proximal end securely mounted in a bundle holder, the bundle holder being disposed within the light source holder and positioned at a predetermined focal distance from the light source to allow light from the light source to be transmitted to the second ends of the optical fibers along the longitudinal length.

12. The illumination device of claim 11 wherein the power source is coupled to the receptacle via a power adapter and a power adapter plug.

13. The illumination device of claim 11 wherein the light source comprises at least a light emitting diode (LED).

14. The illumination device of claim 11 wherein the optical fibers are of unequal lengths.

15. The illumination device of claim 11 wherein the electronic assembly comprises a circuit to generate a flashing sequence to the light source when the switch activates the power source.

16. The illumination device of claim 11 wherein the housing is approximately five centimeters long and approximately two centimeters wide.

17. The illumination device of claim 16 wherein the focal distance ranges from 3 millimeters to 10 millimeters.

18. A display item comprising:

a plurality of symbols attached to a surface;

an illuminating device mounted onto the surface to illuminate the plurality of symbols, the illuminating device comprising:

an electronic assembly coupled to a power source;

a light source coupled to the electronic assembly to emit light;

a switch coupled to the electronic assembly to activate the power source for controlling an illumination from the light source;

a housing having a base and a cover, the base providing a rib guide to secure the light source and an area for holding the electronic assembly, the cover and the base, when coupled together via a coupling post, providing an aperture at one end of the housing; and a bundle of optical fibers having a proximal end, a distal end and a longitudinal length, the proximal end and the distal end being formed respectively by first ends and second ends of the optical fibers, the proximal end securely mounted in a bundle holder disposed through the aperture of the housing and positioned at a predetermined focal distance from the light source to allow light from the light source to be transmitted to the second ends of the optical fibers along the longitudinal length; and wherein the second ends of the optical fibers are attached to the plurality of symbols such that when the light is transmitted to the distal end, the plurality of symbols are illuminated.

19. The display item of claim 18 wherein the cover has an opening to allow the power source to be secured onto the electronic assembly, the opening being closed by a closure attachable to the housing via a screw assembly that tightens the closure to the coupling post.

20. The display item of claim 18 wherein the power source is a battery.

21. The display item of claim 18 wherein the light source comprises at least a light emitting diode (LED).

22. The display item of claim 18 wherein the optical fibers are of unequal lengths.

23. The display item of claim 18 wherein the electronic assembly comprises a circuit to generate a flashing sequence to the light source when the switch activates the power source.

24. The display item of claim 18 wherein the rib guide provides a plurality of ribs to secure the light source at corresponding focal distances from the bundle of the optical fibers.

25. The display item of claim 24 wherein the housing is approximately five centimeters long and approximately two centimeters wide.

26. The display item of claim 25 wherein the focal distance ranges from 3 millimeters to 10 millimeters.

* * * * *